United States Patent
Bronsaer et al.

(10) Patent No.: US 10,640,582 B2
(45) Date of Patent: May 5, 2020

(54) OLEFIN POLYMERIZATION PROCESS

(71) Applicant: SABIC Global Technologies B.V., Bergen op Zoom (NL)

(72) Inventors: Petrus Johannes Hubertus Bronsaer, Maastricht (NL); Arjen van Miltenburg, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 138 days.

(21) Appl. No.: 16/062,153

(22) PCT Filed: Nov. 29, 2016

(86) PCT No.: PCT/EP2016/079102
§ 371 (c)(1),
(2) Date: Jun. 14, 2018

(87) PCT Pub. No.: WO2017/102303
PCT Pub. Date: Jun. 22, 2017

(65) Prior Publication Data
US 2018/0362672 A1    Dec. 20, 2018

(30) Foreign Application Priority Data

Dec. 15, 2015 (EP) .................................... 15200128

(51) Int. Cl.
| | | |
|---|---|---|
| *C08F 2/01* | (2006.01) | |
| *C08F 2/34* | (2006.01) | |
| *C08F 210/02* | (2006.01) | |
| *C08F 210/06* | (2006.01) | |
| *B01D 3/06* | (2006.01) | |
| *B01D 5/00* | (2006.01) | |

(52) U.S. Cl.
CPC ................. *C08F 2/34* (2013.01); *B01D 3/06* (2013.01); *B01D 5/0081* (2013.01); *C08F 2/01* (2013.01); *C08F 210/02* (2013.01); *C08F 210/06* (2013.01); *C08F 2400/02* (2013.01)

(58) Field of Classification Search
CPC ..................................... C08F 2/01; C08F 2/34
See application file for complete search history.

(56) References Cited

U.S. PATENT DOCUMENTS

| | | | |
|---|---|---|---|
| 4,921,919 A | 5/1990 | Lin et al. | |
| 6,593,506 B1 * | 7/2003 | Searle | C07C 1/20 585/638 |

(Continued)

FOREIGN PATENT DOCUMENTS

| | | |
|---|---|---|
| EP | 2083020 | 7/2009 |
| WO | 2014053443 A1 | 4/2014 |

OTHER PUBLICATIONS

International Search Report for International Application No. PCT/EP2016/079102; dated Feb. 17, 2017; 4 pages.

(Continued)

*Primary Examiner* — Rip A Lee
(74) *Attorney, Agent, or Firm* — Cantor Colburn LLP

(57) ABSTRACT

The present invention relates to an olefin polymerization process comprising polymerization of at least one olefin monomer in one or more polymerization reactors. In addition, the present invention relates to a system for vapor phase polymerization of at least one polymerizable monomer.

15 Claims, 2 Drawing Sheets

(56) References Cited

U.S. PATENT DOCUMENTS

| | | | | |
|---|---|---|---|---|
| 7,582,723 B2* | 9/2009 | Penzo | ................... | B01J 8/24 |
| | | | | 528/483 |
| 8,586,685 B2* | 11/2013 | Hussein | ................ | B01J 8/22 |
| | | | | 526/70 |
| 8,636,831 B2* | 1/2014 | Van Der Schrick | .... | C08F 6/001 |
| | | | | 203/71 |
| 9,096,694 B1* | 8/2015 | Gupta | ................. | B01J 19/18 |
| 9,683,063 B2* | 6/2017 | Chamayou | ............ | C08F 2/34 |
| 9,790,293 B2* | 10/2017 | Betton | ................. | C08J 11/02 |
| 10,035,864 B2* | 7/2018 | Sandell | ................ | C08F 2/01 |

OTHER PUBLICATIONS

Written Opinion of the International Search Report for International Application No. PCT/EP2016/079102; dated Feb. 17, 2017; 7 pages.

* cited by examiner

OLEFIN POLYMERIZATION PROCESS

CROSS REFERENCE TO RELATED APPLICATIONS

This application is a 371 of International Application No. PCT/EP2016/079102, filed Nov. 29, 2016, which claims priority to European Application No. 15200128.5, filed Dec. 15, 2015, both of which are incorporated herein by reference in their entirety.

The present invention relates to an olefin polymerization process comprising polymerization of at least one olefin monomer in one or more polymerization reactors.

Processes for vapor-phase polymerization of monomers in a vapor-phase, quench-cooled reactor vessel are known in the art.

For example U.S. Pat. No. 4,921,919 relates to a method and apparatus for minimizing the formation of polymer agglomerates or lumps in a reactor used in the gas-phase polymerization of polypropylene. In operation of vapor-phase polymerization processes using vapor-phase, quench-cooled reactor vessels such processes and apparatus, particles of polymer are formed around solid catalyst particles. The horizontally disposed reactor vessel typically has recycled propylene gas introduced into the bottom thereof together with hydrogen gas. Then, liquid propylene, as a quench liquid, is injected into the reactor from the top of the reactor. The hydrogen is provided for molecular weight control. Agitators inside the vessel stir the contents of the vessel. At a so-called upstream end of the vessel a catalyst system comprising a catalyst injected at one point into the top of the vessel, and a cocatalyst plus modifier injected at a point adjacent the point of injection of the catalyst, is injected into the top of the vessel. Solid polypropylene powder is created in the vessel and is withdrawn from the downstream end thereof.

EP 1 853 635 relates to a process for the polymerization of ethylene in which the ethylene is polymerized in the presence of a catalyst in a gas-phase reactor to form polymer particles and reaction gas comprising propane and unpolymerized ethylene is circulated to remove the heat of polymerization, wherein the polymer particles are discharged continuously or discontinuously from the reactor, the polymer particles are separated from the major part of the concomitantly discharged gas and the polymer particles are degassed, the gas is freed of entrained fine particles, the gas is separated from a low-boiling fraction comprising in a first separation stage, a propane fraction is separated off in a second separation stage and this propane fraction is used for degassing the polymer particles discharged from the reactor.

EP 2 083 020 relates to a process for the recovery of unreacted monomers from a polyolefin polymerization process, comprising the steps of recovering a fluid stream generated by the separation of the polyolefin product from the polymerization fluid comprising unreacted monomers and optionally comonomers, contacting said fluid stream in an absorption zone with a scrub liquid, thereby absorbing at least a portion of the unreacted monomers in said scrub liquid; and withdrawing from said absorption zone a vapor overhead comprising light gas and an absorber bottoms scrub liquid comprising said unreacted monomer and thereby recovering said unreacted monomer in said absorber bottoms scrub liquid.

U.S. Pat. No. 6,593,506 relates to a method of producing olefins from oxygenates comprising converting olefins in a purge stream in a polyolefin production process to an alcohol thereby producing an alcohol containing stream, mixing an oxygenate feed stream with the alcohol containing stream, and converting the mixed oxygenate feed stream and alcohol containing stream in the presence of an olefin forming catalyst to form an olefin product stream.

WO 2014/053443 relates to a process for improving the operations of a polymerisation plant comprising at least one polymerisation reactor and an optional degassing section, wherein the polymerisation reactor comprises process hydrocarbons consisting of the monomer, the optional comonomer(s) and preferably at least one inert hydrocarbon diluent, together with aluminium containing compound(s); and the polymerisation plant comprises liquid purge stream(s) which comprises aluminium containing compounds and potentially polymer fines, together with accumulated hydrocarbons which are different from the said process hydrocarbons, wherein the petrochemical complex also comprises a multipurpose hydrocarbon treatment unit which separates the liquid purge stream(s) into one stream comprising substantially all of the aluminium containing compounds and potentially polymer fines, and one stream comprising the accumulated hydrocarbons.

According to the existing technology there is a liquid purge from the reactor outlet streams. Such a purge or a liquid bleed from the polypropylene plant mainly contains propylene. However, this propylene is a valuable component, while the main purpose of the liquid bleed is to bleed propane. Considering the low fraction of propane, this purge or recycle on a production site to the propylene production is relatively larger than would be needed based on propane fed to the polypropylene plant (as impurity of the propylene).

Other valuable components of such a purge or liquid bleed are the light comonomers, e.g. ethylene. These valuable components would also be lost via that liquid bleed. Consequently a higher ethylene feed to polypropylene process is needed/recycled.

Besides the presence of valuable components in the liquid bleed the heat capacity of the bleed is also an important energy factor. The liquid can be identified as one of the coldest streams in the polypropylene plant and thus drains unnecessary extra cooling capacity of the polypropylene condenser.

An aspect of the present invention is to take the valuable components of the liquid bleed into account when designing a new process scheme for a polypropylene plant.

Another aspect of the present invention is to design a new process scheme for a polypropylene plant wherein the capacity of the polypropylene condenser is used in a beneficial way.

The present invention thus relates to an olefin polymerization process comprising polymerization of at least one olefin monomer in one or more polymerization reactors wherein the polymerization process is carried out in an apparatus comprising:

a) one or more reactor vessels to which olefin monomer and catalyst components can be added and which contain an agitated bed of forming polymer particles;

b) a means for removing a stream comprising polymer particles from the reactor;

c) a means for removing a gas-liquid stream comprising unreacted olefin monomers from the reactor;

d) a means for withdrawing a liquid recycle stream from the gas-liquid stream;

e) a means for recycle a gas-liquid stream of c) to the reactor; wherein the process further comprises the steps of i) withdrawing a gaseous stream from the stream comprising polymer particles;

ii) contacting a liquid recycle stream from d) with said gaseous stream from i) thereby forming a mixture;

iii) withdrawing a liquid stream from the mixture of ii);

iv) recycling a vapor stream from the mixture of ii) to the polymerization reactor.

On basis of the above process steps i)-iv), especially wherein the liquid bleed, i.e. the liquid recycle stream from the gas-liquid stream originating from the polymerization reactor, is contacted with the gaseous stream from the stream comprising polymer particles, one or more aspects are fulfilled. In other words, the liquid bleed is contacted with the gaseous stream originating from the polymer particles before it is recycled to the propylene production plant.

The present inventors found that the present olefin polymerization process has resulted in a lower cooling demand for the condenser, since the present liquid bleed according step d) has a higher temperature than the conventional liquid purge, i.e. a purge without the additional contacting step with the gaseous stream according to present step ii). This aspect has a positive influence on the capacity of the polymer production. And due to the recovery of the valuable components in the vapor/liquid-contactor the propylene feed can be reduced.

The contact between the liquid phase and the gaseous phase can take place via a single stage vapor/liquid-contactor, i.e. a single stage flash vessel. In a preferred embodiment the contact between the liquid phase and the gaseous phase can take place in a multi stage vapor-liquid contacting column thereby improving the equilibrium compositions. Furthermore, the vapor/liquid-contactor may include a reboiler and/or condenser.

In a preferred embodiment of the present olefin polymerization process the gaseous stream originating from i) is compressed before contacting the gaseous stream with a liquid recycle stream from d).

In another preferred embodiment of the present olefin polymerization process the vapor stream from the mixture of ii) is compressed before recycling the vapor stream to the polymerization reactor.

According to the present olefin polymerization process step d) is preferably carried out after cooling of the combined stream.

In a preferred embodiment the pressure of the vapor/liquid-contactor as discussed above is lower than the pressure of the vapour-liquid stream originating from the polymerization reactor resulting in a higher recovery of ethylene from the liquid bleed, i.e. the liquid recycle stream from the gas-liquid stream as mentioned in step d).

On basis of the present olefin polymerization process the present inventors achieved a financial advantage over the existing technology resulting in lower costs of recycle streams to/from monomer production plant. In addition, the present liquid purge stream from the vapor/liquid-contactor can be recycled back to several process units, for example a steam cracker. This provides a more efficient use of the recycle streams causing an increase of capacity of monomers plant.

The present invention furthermore relates to a system for vapor phase polymerization of at least one polymerizable monomer, said system comprises one or more reactor vessels to which olefin monomer and catalyst components can be added and which contain an agitated bed of forming polymer particles, a means for feeding monomer feed to said one or more reactor vessels, a means for removing a stream comprising polymer particles from the reactor, a means for removing a gas-liquid stream comprising unreacted olefin monomers from the reactor, a means for withdrawing a liquid recycle stream from the gas-liquid stream and a means for recycle a gas-liquid stream to the reactor. The means for obtaining a separated liquid and vapor stream from the gas-liquid reactor outlet stream comprises a condenser and/or reboiler The system for vapor phase polymerization of at least one polymerizable monomer according to the present invention further comprises a means for withdrawing a gaseous stream from the stream comprising polymer particles, a means for contacting a liquid recycle stream with a gaseous stream thereby forming a mixture, a means for withdrawing a liquid stream from the mixture, and a means for recycling a vapor stream from the mixture to the polymerization reactor. Such a system is especially suitable for the present olefin polymerization process.

The means for contacting a liquid recycle stream with a gaseous stream preferably comprise a single stage flash vessel, especially in a preferred embodiment a multi stage vapor-liquid contacting column.

In an embodiment of the present system the means for contacting a liquid recycle stream with a gaseous stream comprise a reboiler and/or condensor.

The present invention furthermore relates to an olefin polymerization process, wherein the process is a homopolymer production process.

The present invention also relates to an olefin polymerization process, wherein the process is an ethylene copolymer production process.

The present invention will now be discussed with reference to the drawings. The drawings are only for illustrative purposes. The for skilled man known equipment such as pumps, valves, measuring and control system have been omitted.

Figure 1:
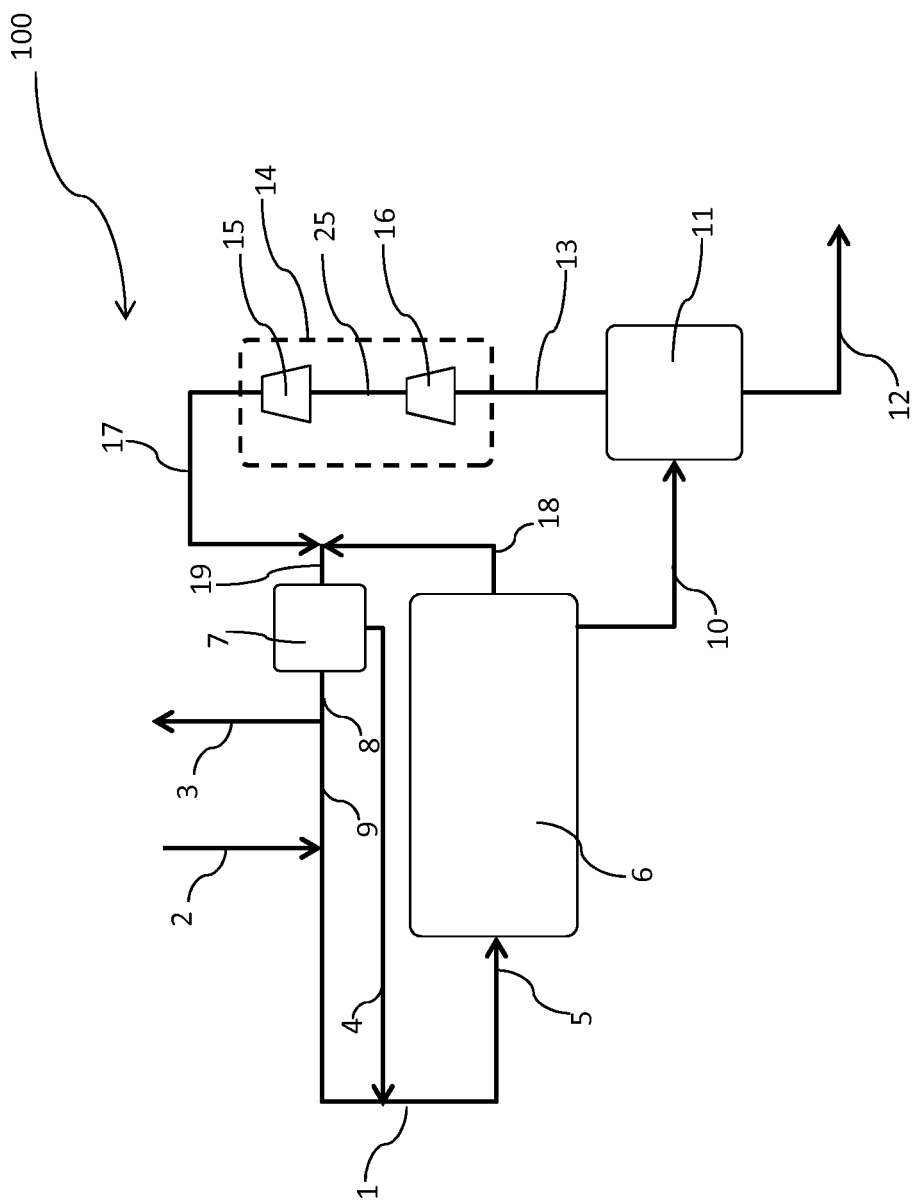
FIG. 1 shows a process flow diagram of an olefin polymerization process according to the prior art.
Figure 2:
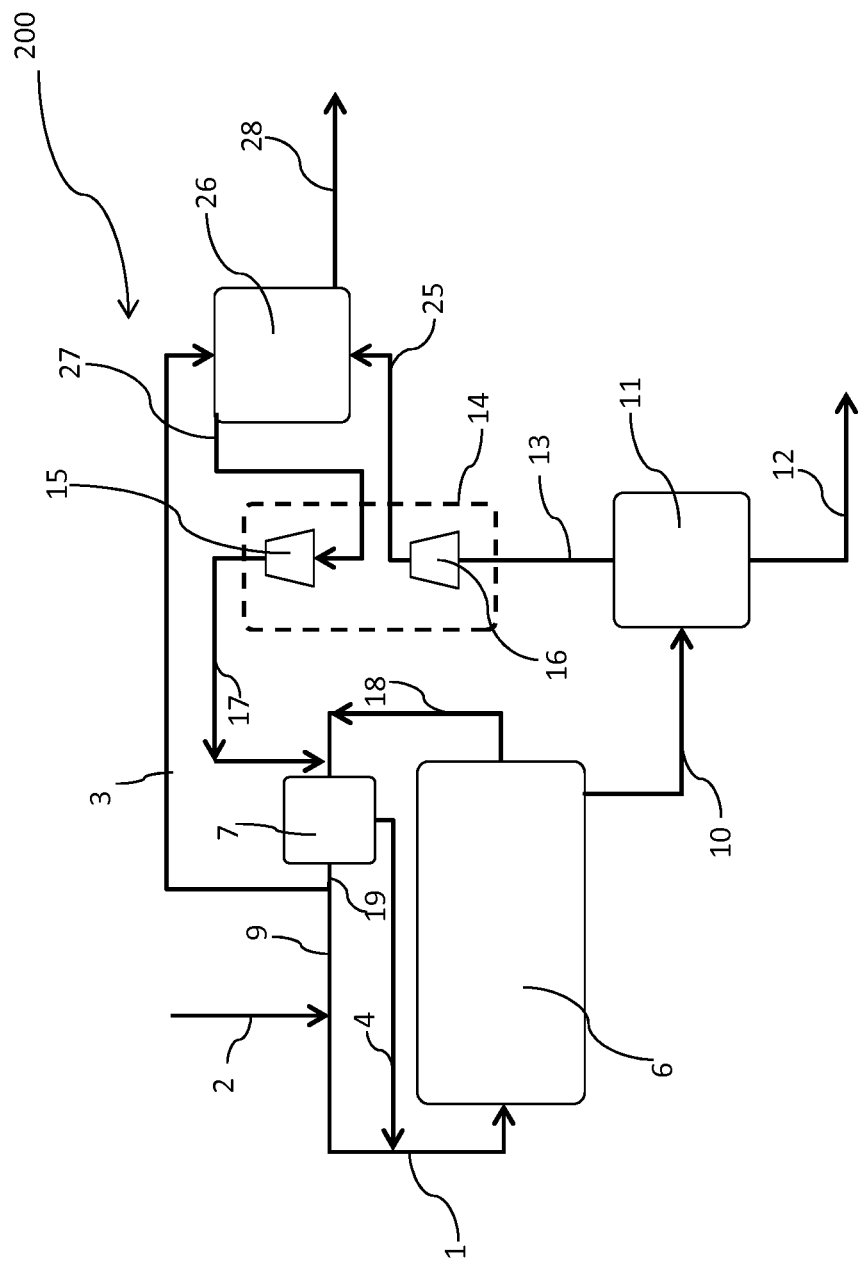
FIG. 2 shows a process flow diagram of an olefin polymerization process according to the present invention.

In both FIGS. 1 and 2 the same reference numbers have been used, whenever necessary.

According to the flowsheet shown in FIG. 1 the olefin polymerization process 100 comprises a reactor 6 with an inlet 1 (liquid) and an inlet 4 (vapor). In reactor 6 the reactants form the polymer particles and a mixed stream 10 of polymer particles and vapor is withdrawn from reactor 6. Mixed stream 10 is sent to a product discharge vessel 11 wherein a separation takes place between a stream 12 of polymer particles and a gas stream 13. Stream 13 is sent to a multi-stage compressor 14, including a first compressor 16 and a second compressor 15. The stream 25 coming from first compressor 16 is sent to the inlet of second compressor 15. The resulting compressed stream 17 is contacted with stream 18, i.e. the vapor outlet of reactor 6. The combined stream 19 is sent to a condenser 7 resulting is a cooled stream 8. Part of stream 8 is a purge 3 (liquid) of the recycle loop. The remainder part 9 is recycled to reactor 6. Multi-stage compressor 14 as shown herein comprises two separate compressors but it should be noted that such a multi-stage compressor may comprise more compressors.

As shown in FIG. 1 purge 3 is sent to other process units, i.e. there is no direct recycle or return of that purge 3 to the reactor 6.

According to the flowsheet shown in FIG. 2 the olefin polymerization process 200 comprises a reactor 6 with an inlet 1, a vapor-liquid outlet 18 and a vapor-particles outlet 10. Outlet 10 is a mixed stream of polymer particles and vapor withdrawn from reactor 6. That mixed stream of polymer particles and vapor withdrawn from reactor 6 is sent to a product discharge vessel 11 wherein a separation takes place between a stream 12 of polymer particles and a gas stream 13. Gas stream 13 is sent to a compressor 16 and the compressed vapor stream 25 is sent to a vapor-liquid contactor 26. A liquid purge 3 of the vapor-liquid 18 coming from reactor 6 is sent to the inlet of vapor-liquid contactor 26. In vapor-liquid contactor 26 an intimate contact between vapor stream 25 and liquid purge 3 takes place resulting in liquid effluent 28, i.e. another liquid purge. Gas recycle 27 from vapor-liquid contactor 26 is sent to compressor 15 and the compressed vapor stream 17 is recycled back to the recycle loop. Compressor 15 and 16 may form a multi-stage compressor 14.The combination of vapor stream 17 and vapor-liquid outlet 18 from reactor 6 is sent to unit 7 resulting in a stream 19 and a stream 4. According to another embodiment (not shown here) vapor stream 17 can bypass unit 7 and is thus directly combined with vapor stream 4. After withdrawing a liquid purge 3 from stream 19 the remainder stream 9 is combined with stream 2 and the resulting stream 1 is used as the inlet for reactor 6. It is noted that some reference numbers, such as 20-24, have not be used in the present description.

As shown in FIG. 2 purge 3 is recycled to the reactor 6 via intermediate process steps. These intermediate process steps comprise the step of contacting the gas from the product discharge vessel with that purge in a vapor-liquid contactor. After that contact a liquid stream is withdrawn from that vapor-liquid contactor and a gas recycle from that vapor-liquid contactor is carried out. Before returning that recycle gas stream back to the polymerization reactor the recycle gas stream is compressed to the inlet pressure of the polymerization reactor. FIG. 2 is thus different from FIG. 1.

In order to demonstrate the benefits of the present olefin polymerization process (as shown in FIG. 2) over the olefin polymerization process according to the prior art (as shown in FIG. 1) a polypropylene polymerization plant model has been fitted in Mobatec Modeller to describe the plant operation and polymerization kinetics. The plant model provides the concentrations of species in the various stream using empirical or scientific thermodynamic relations. An Aspen Plus (AspenTech) model of the Vapor-Liquid Contactor 26 (see FIG. 2) was constructed for a single stage vapor-liquid contactor. The Aspen plus model was then used to investigate various cases of possible flows, conditions and composition data of the streams 3 (Purge of Recycle Loop (Liquid)) and 13 (Gas from Product Discharge Vessel (Vapor)) from a database. Based on the Aspen Plus model flow, conditions and composition data of streams 17 (Outlet of Multi-Stage Compressor (high pressure gas recycle)) and 28 (Effluent from Vapor-Liquid Contactor) are obtained.

The results of the simulation will be discussed now.

In the results below the temperature range for stream 3 is in a range of 20-50° C. That range is primarily correlated to the temperature of the cooling water temperature. The temperature range for stream 13 is in a range of 55-110° C. Please note that as long as stream 3 is colder than stream 13, there will be some heat benefit, i.e. stream 28 is warmer (see FIG. 2). Consequently, the cooling load of the condensor of the entire system/plant is thus reduced. The temperature for both stream 13 and stream 3 in the experiments shown in Table 1 (prior art) and Table 2 (according to the invention) will be in the same range. The same applies for the temperature range for stream 13 and stream 3 in the experiments shown in Table 4 (prior art) and Table 5 (according to the invention) and in the experiments shown in Table 7 prior art) and Table 8 (according to the invention). The inventors assume that the temperature of these streams may slightly change for the embodiments according to the invention. Such a small difference in temperature may be caused by the exact routing of stream 17, i.e. stream 17 may be sent to the inlet of unit 7 or may be combined with the vapor stream coming from that unit 7, i.e. bypassing unit 7.

TABLE 1

| Stream 13 (Vapor) | Stream 3 (Liquid = Plant bleed) |
|---|---|
| Propylene: 85% | Propylene: 90% |
| Propane: 15% | Propane: 10% (=30 kg/h) |
| Flow: 1000 kg/h | Flow: 300 kg/h |
| T = Warm | T = Cold |

TABLE 2

| Table 2 Stream 13 (Vapor) | Stream 3 (Liquid) |
|---|---|
| Propylene: 85% | Propylene: 90% |
| Propane: 15% | Propane: 10% |
| Flow: 1000 kg/h | Flow: 500 kg/h |

TABLE 3

| Stream 17 (Vapor) | Stream 28 (Liquid = Plant bleed) |
|---|---|
| Propylene: 86.8% | Propylene: 85.6% |
| Propane: 13.2% | Propane: 14.4% (=30 kg/h) |
| Flow: 1292 kg/h | Flow: 208 kg/h |
| T = Colder as Stream 13 | T = Warmer as Stream 3 |

Table 1, 2 and 3 refer to a process for a homopolymer production. The data shown in Table 1 refer to a process according to the prior art (FIG. 1). The calculations are normalized to stream 13=1000 kg/h and assumed 10% propane in stream 3. The same normalization applies for the data shown in Table 2 and Table 3. Both Table 2 and Table 3 refer to process flow diagram according to FIG. 2.

From the simulation results one can see that the additional process unit in the process according to the present invention, namely the Vapor-Liquid Contactor as a single stage flash vessel, provides 1% saving for monomer feed (polymer grade, 99.5%) that recycles back via the monomer plant. This lower recycle stream could mean a possibility to increase the cracker feed by 1%.

TABLE 4

| Stream 13 (Vapor) | Stream 3 (Liquid = Plant bleed) |
|---|---|
| Ethylene: 5% | Ethylene: 10% |
| Propylene: 60% | Propylene: 70% |
| Propane: 35% | Propane: 20% (=43 kg/h) |
| Flow: 1000 kg/h | Flow: 215 kg/h |
| T = Warm | T = Cold |

TABLE 5

| Stream 13 (Vapor) | Stream 3 (Liquid) |
|---|---|
| Ethylene: 5% | Ethylene: 10% |
| Propylene: 60% | Propylene: 70% |
| Propane: 35% | Propane: 20% |
| Flow: 1000 kg/h | Flow: 160 kg/h |

TABLE 6

| Stream 17 (Vapor) | Stream 28 (Liquid = Plant bleed) |
|---|---|
| Ethylene: 6% | Ethylene: 2.5% |
| Propylene: 61.4% | Propylene: 61.2% |
| Propane: 32.6% | Propane: 36.3% (=43 kg/h) |
| Flow: 1040 kg/h | Flow: 120 kg/h |
| T = Colder as Stream 13 | T = Warmer as Stream 3 |

Table 4, 5 and 6 refer to a process for ethylene copolymer production. The data shown in Table 4 refer to a process flow diagram according to the prior art (FIG. 1). The calculations are normalized to stream 13=1000 kg/h and assumed 10% ethylene and 20% propane in stream 3. The same normalization applies for the data shown in Table 5 and Table 6. Both Table 5 and Table 6 refer to a process flow diagram according to FIG. 2.

From the simulation results one can see that the additional process unit in the process according to the present invention, namely the Vapor-Liquid Contactor as a single stage flash vessel, provides 1% saving for a 99.5% monomer feed that recycles back via the monomer plant. This lower recycle stream could mean a possibility to increase the cracker feed by 1%.

TABLE 7

| Stream 13 (Vapor) | Stream 3 (Liquid = Plant bleed) |
|---|---|
| Ethylene: 5% | Ethylene: 10% |
| Propylene: 60% | Propylene: 70% |
| Propane: 35% | Propane: 20% (=43 kg/h) |
| Flow: 1000 kg/h | Flow: 215 kg/h |
| T = Warm | T = Cold |

TABLE 8

| Stream 13 (Vapor) | Stream 3 (Liquid) |
|---|---|
| Ethylene: 5% | Ethylene: 10% |
| Propylene: 60% | Propylene: 70% |
| Propane: 35% | Propane: 20% |
| Flow: 1000 kg/h | Flow: 190 kg/h |

TABLE 9

| Stream 17 (Vapor) | Stream 28 (Liquid = Plant bleed) |
|---|---|
| Ethylene: 6.2% | Ethylene: 2.2% |
| Propylene: 61.6% | Propylene: 61.4% |
| Propane: 32.2% | Propane: 36.4% (=43 kg/h) |
| Flow: 1070 kg/h | Flow: 120 kg/h |
| T = Colder as Stream 13 | T = Warmer as Stream 3 |

Table 7, 8 and 9 refer to a process for ethylene copolymer production. The data shown in Table 7 refer to a process flow diagram according to the prior art (FIG. 1). The calculations are normalized to stream 13=1000 kg/h and assumed 10% ethylene and 20% propane in stream 3. The same normalization applies for the data shown in Table 8 and Table 9. Both Table 8 and Table 9 refer to a process flow diagram according to FIG. 2.

From the simulation results one can see that the additional process unit in the process according to the present invention, namely the Vapor-Liquid Contactor as a single stage flash vessel at 20% lower pressure compared to stream 19 (see FIG. 2), provides 1% saving for monomer feed that recycles back via the monomer plant. This lower recycle stream could mean a possibility to increase the cracker feed by 1%.

FIG. 1
1. Reactor Feed
2. Monomer Feed (Liquid)
3. Purge of Recycle Loop (Liquid)
4. Reactor Feed (Vapor)
5. Combined Reactor Feed
6. Reactor
7. Condenser
8. Outlet of Condensor
9. Recycle Loop (Liquid)
10. Reactor Product (Polymer and Vapor)
11. Product Discharge Vessel/Baghouse
12. Powder Product (Polymer)
13. Gas from Product Discharge Vessel (Vapor)
14. Multi-Stage Compressor
15. Second Compressor
16. First Compressor
17. Outlet of Multi-Stage Compressor (high pressure gas recycle)
18. Reactor Outlet (Vapor)
19. Combined Reactor Outlet and Outlet of Multi-Stage Compressor
100. Olefin Polymerization Process FIG. 2
1. Reactor Feed
2. Monomer Feed
3. Purge of Recycle Loop (Liquid)
4. Reactor Feed (Vapor)
6. Reactor
7. Condenser
10. Reactor Product (Polymer and Vapor)
11. Product Discharge Vessel/Baghouse
12. Powder Product (Polymer)
13. Gas from Product Discharge Vessel (Vapor)
14. Multi-Stage Compressor
15. Second Compressor
16. First Compressor
17. Outlet of Multi-Stage Compressor (high pressure gas recycle)
18. Reactor Outlet (Vapor)
19. Combined Reactor Outlet and Outlet of Multi-Stage Compressor
25. Low pressure gas from First Compressor
26. Vapor-Liquid Contactor
27. Gas recycle from Vapor-Liquid Contactor
28. Effluent from Vapor-Liquid Contactor
200. Olefin Polymerization Process

The invention claimed is:
1. An olefin polymerization process comprising polymerization of at least one olefin monomer in one or more polymerization reactors wherein the polymerization process is carried out in an apparatus comprising:
   a) one or more reactor vessels to which olefin monomer and catalyst components can be added and which contain an agitated bed of forming polymer particles;
   b) a means for removing a stream comprising polymer particles from the reactor;
   c) a means for removing a gas-liquid stream comprising unreacted olefin monomers from the reactor;
   d) a means for withdrawing a liquid recycle stream from the gas-liquid stream;
   e) a means for recycling the gas-liquid stream of c) to the reactor; wherein the process further comprises the steps of i) withdrawing a gaseous stream from the stream comprising polymer particles;
   ii) contacting the liquid recycle stream from d) with said gaseous stream from i) thereby forming a mixture;

iii) withdrawing a liquid stream from the mixture of ii);
iv) recycling a vapor stream from the mixture of ii) to the polymerization reactor.

2. An olefin polymerization process according to claim 1, wherein the gaseous stream originating from i) is compressed before contacting the gaseous stream with a liquid recycle stream from d).

3. An olefin polymerization process according to claim 1, wherein the vapor stream from the mixture of ii) is compressed before recycling the vapor stream to the polymerization reactor.

4. An olefin polymerization process according to claim 1, wherein step d) is carried out after cooling of the gas-liquid stream.

5. An olefin polymerization process according to claim 1, wherein a pressure prevailing in step ii) is lower than a pressure prevailing in the polymerization reactor.

6. An olefin polymerization process according to claim 1, wherein the process is a homopolymer production process.

7. An olefin polymerization process according to claim 1, wherein the process is an ethylene copolymer production process.

8. A system suitable for a vapor phase polymerization of at least one polymerizable monomer according to the process of claim 1, comprising one or more reactor vessels to which olefin monomer and catalyst components are added and which contains an agitated bed of forming polymer particles, a means for feeding monomer feed to said one or more reactor vessels, a means for removing a stream comprising polymer particles from the one or more reactor vessels, a means for removing a gas-liquid stream comprising unreacted olefin monomers from the one or more reactor vessels, a means for withdrawing a liquid recycle stream from the gas-liquid stream and a means for recycling the gas-liquid stream to the one or more reactor vessels, said system further comprising a means for withdrawing a gaseous stream from the stream comprising polymer particles, a means for contacting the liquid recycle stream with the gaseous stream thereby forming a mixture, a means for withdrawing a liquid stream from the mixture, and a means for recycling a vapor stream from the mixture to the one or more reactor vessels.

9. A system according to claim 8, wherein said means for contacting the liquid recycle stream with the gaseous stream comprises a single stage flash vessel.

10. A system according to claim 8, wherein said means for contacting the liquid recycle stream with the gaseous stream comprises a multi stage vapor-liquid contacting column.

11. A system according to claim 8, wherein said means for contacting the liquid recycle stream with the gaseous stream comprises a reboiler and/or condenser.

12. A system suitable for a vapor phase polymerization of at least one polymerizable monomer, comprising one or more reactor vessels to which olefin monomer and catalyst components are added and which contains an agitated bed of forming polymer particles, a means for feeding monomer feed to said one or more reactor vessels, a means for removing a stream comprising polymer particles from the one or more reactor vessels, a means for removing a gas-liquid stream comprising unreacted olefin monomers from the one or more reactor vessels, a means for withdrawing a liquid recycle stream from the gas-liquid stream and a means for recycling the gas-liquid stream to the one or more reactor vessels, said system further comprising a means for withdrawing a gaseous stream from the stream comprising polymer particles, a means for contacting the liquid recycle stream with the gaseous stream thereby forming a mixture, a means for withdrawing a liquid stream from the mixture, and a means for recycling a vapor stream from the mixture to the one or more reactor vessels.

13. A system according to claim 12, wherein said means for contacting the liquid recycle stream with the gaseous stream comprises a single stage flash vessel.

14. A system according to claim 12, wherein said means for contacting the liquid recycle stream with the gaseous stream comprises a multi stage vapor-liquid contacting column.

15. A system according to claim 12, wherein said means for contacting the liquid recycle stream with the gaseous stream comprises a reboiler and/or condenser.

\* \* \* \* \*